United States Patent
Goto

(10) Patent No.: US 10,681,526 B2
(45) Date of Patent: Jun. 9, 2020

(54) SETTING A COMMUNICATION PARAMETER FOR CONNECTING TO A WIRELESS NETWORK BETWEEN A BASE STATION AND A SLAVE STATION WHEREIN A COMMUNICATION DEVICE COMMUNICATES IN THE ROLE OF A BASE STATION BASED ON THE COMMUNICATION DEVICE DISPLAYING AN IMAGE

(71) Applicant: CANON KABUSHIKI KAISHA, Tokyo (JP)

(72) Inventor: Fumihide Goto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 83 days.

(21) Appl. No.: 15/564,701

(22) PCT Filed: Mar. 30, 2016

(86) PCT No.: PCT/JP2016/001835
§ 371 (c)(1),
(2) Date: Oct. 5, 2017

(87) PCT Pub. No.: WO2016/163104
PCT Pub. Date: Oct. 13, 2016

(65) Prior Publication Data
US 2018/0077557 A1    Mar. 15, 2018

(30) Foreign Application Priority Data

Apr. 9, 2015 (JP) .................................. 2015-080448

(51) Int. Cl.
*H04W 8/00* (2009.01)
*H04W 40/24* (2009.01)
(Continued)

(52) U.S. Cl.
CPC ...... *H04W 8/005* (2013.01); *G06K 19/06028* (2013.01); *G06K 19/06037* (2013.01);
(Continued)

(58) Field of Classification Search
CPC ..... H04W 8/005; H04W 12/04; H04W 12/06; H04W 40/24; H04W 4/08; H04W 4/06;
(Continued)

(56) References Cited

U.S. PATENT DOCUMENTS

| 7,269,260 B2 * | 9/2007 | Adachi | H04L 63/04 380/270 |
| 9,436,643 B2 * | 9/2016 | Dees | H04M 1/7253 |

(Continued)

FOREIGN PATENT DOCUMENTS

| JP | 2014-060623 A | 4/2014 |
| JP | 2014-168215 A | 9/2014 |

(Continued)

*Primary Examiner* — Daniel C. Murray
(74) *Attorney, Agent, or Firm* — Canon U.S.A., Inc. IP Division

(57) ABSTRACT

A communication device is provided which shares a communication parameter for establishment of wireless connection with a communication target device by first sharing processing to be executed on the basis of information acquired from a captured image. And it is determined whether the communication device makes communication in a first role in which it operates as a base station or the communication device makes communication in a second role in which it operates as a slave station connected to a wireless network constructed by a base station, in accordance with whether or not the communication device captures the image used for the first sharing processing.

22 Claims, 9 Drawing Sheets

(51) Int. Cl.
*H04W 12/06* (2009.01)
*H04W 4/08* (2009.01)
*G06K 19/06* (2006.01)
*H04W 12/04* (2009.01)
*H04W 4/80* (2018.01)
*H04W 84/12* (2009.01)
*H04W 4/06* (2009.01)

(52) U.S. Cl.
CPC ............. *H04W 4/08* (2013.01); *H04W 12/04* (2013.01); *H04W 12/06* (2013.01); *H04W 40/24* (2013.01); *H04W 4/06* (2013.01); *H04W 4/80* (2018.02); *H04W 84/12* (2013.01)

(58) Field of Classification Search
CPC .. H04W 4/80; H04W 84/12; G06K 19/06028; G06K 19/06037
USPC ........................................................ 709/228
See application file for complete search history.

(56) References Cited

U.S. PATENT DOCUMENTS

| | | | |
|---|---|---|---|
| 9,584,486 B2 * | 2/2017 | Adachi | H04L 63/04 |
| 10,015,646 B2 * | 7/2018 | Thakur | H04W 76/14 |
| 2003/0119484 A1 * | 6/2003 | Adachi | H04L 63/04 |
| | | | 455/411 |
| 2004/0136533 A1 * | 7/2004 | Takagaki | H04L 9/0891 |
| | | | 380/255 |
| 2006/0269053 A1 * | 11/2006 | Miyazawa | G06F 21/606 |
| | | | 380/28 |
| 2008/0192293 A1 * | 8/2008 | Sugimoto | H04N 1/00347 |
| | | | 358/1.15 |
| 2013/0050259 A1 * | 2/2013 | Ahn | G06F 3/1454 |
| | | | 345/633 |
| 2013/0278622 A1 * | 10/2013 | Sun | G06Q 20/22 |
| | | | 345/589 |
| 2014/0068719 A1 * | 3/2014 | Kiukkonen | H04W 12/08 |
| | | | 726/4 |
| 2014/0085666 A1 * | 3/2014 | Park | G06K 15/405 |
| | | | 358/1.15 |
| 2014/0269646 A1 * | 9/2014 | Ramasamy | H04W 76/14 |
| | | | 370/338 |
| 2014/0307874 A1 * | 10/2014 | Adachi | H04L 63/04 |
| | | | 380/270 |
| 2015/0195860 A1 * | 7/2015 | Joshi | H04W 36/00 |
| | | | 370/338 |
| 2015/0249766 A1 * | 9/2015 | Asahara | H04N 1/00856 |
| | | | 358/1.14 |
| 2016/0094958 A1 * | 3/2016 | Thakur | H04W 76/14 |
| | | | 370/338 |

FOREIGN PATENT DOCUMENTS

| | | |
|---|---|---|
| JP | 2014-183340 A | 9/2014 |
| JP | 2014-230152 A | 12/2014 |
| JP | 2014-241487 A | 12/2014 |

* cited by examiner

[Fig. 1]
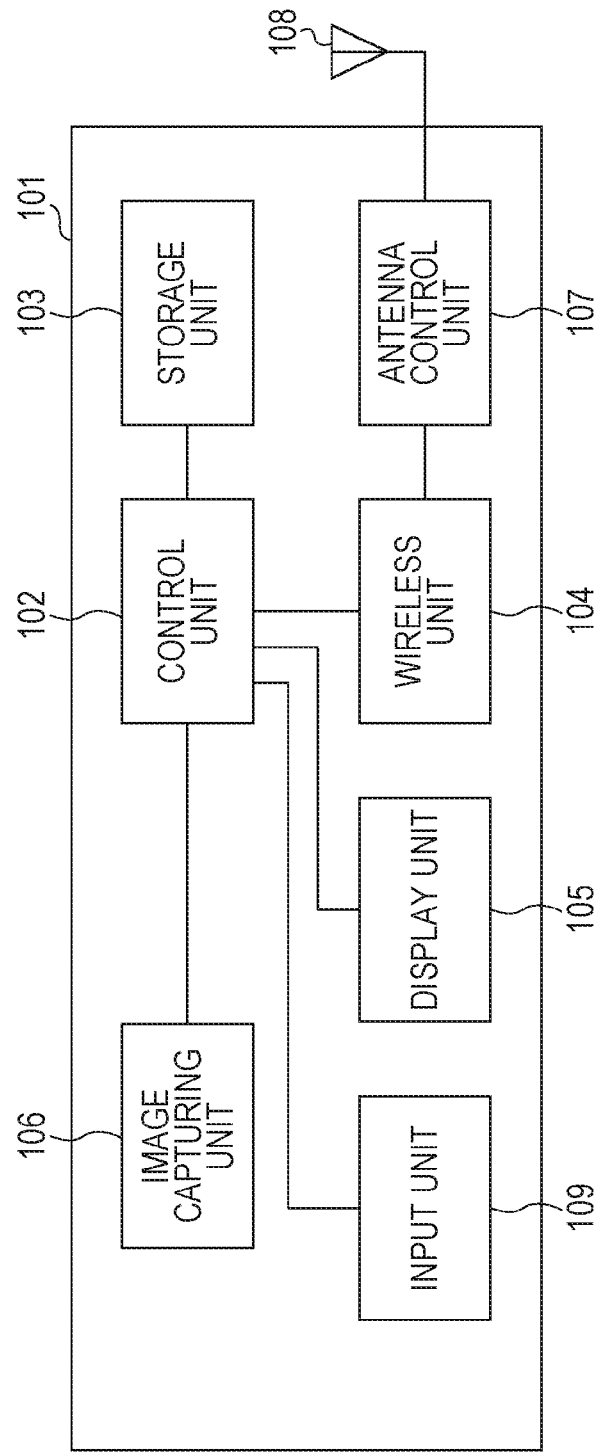

[Fig. 2]
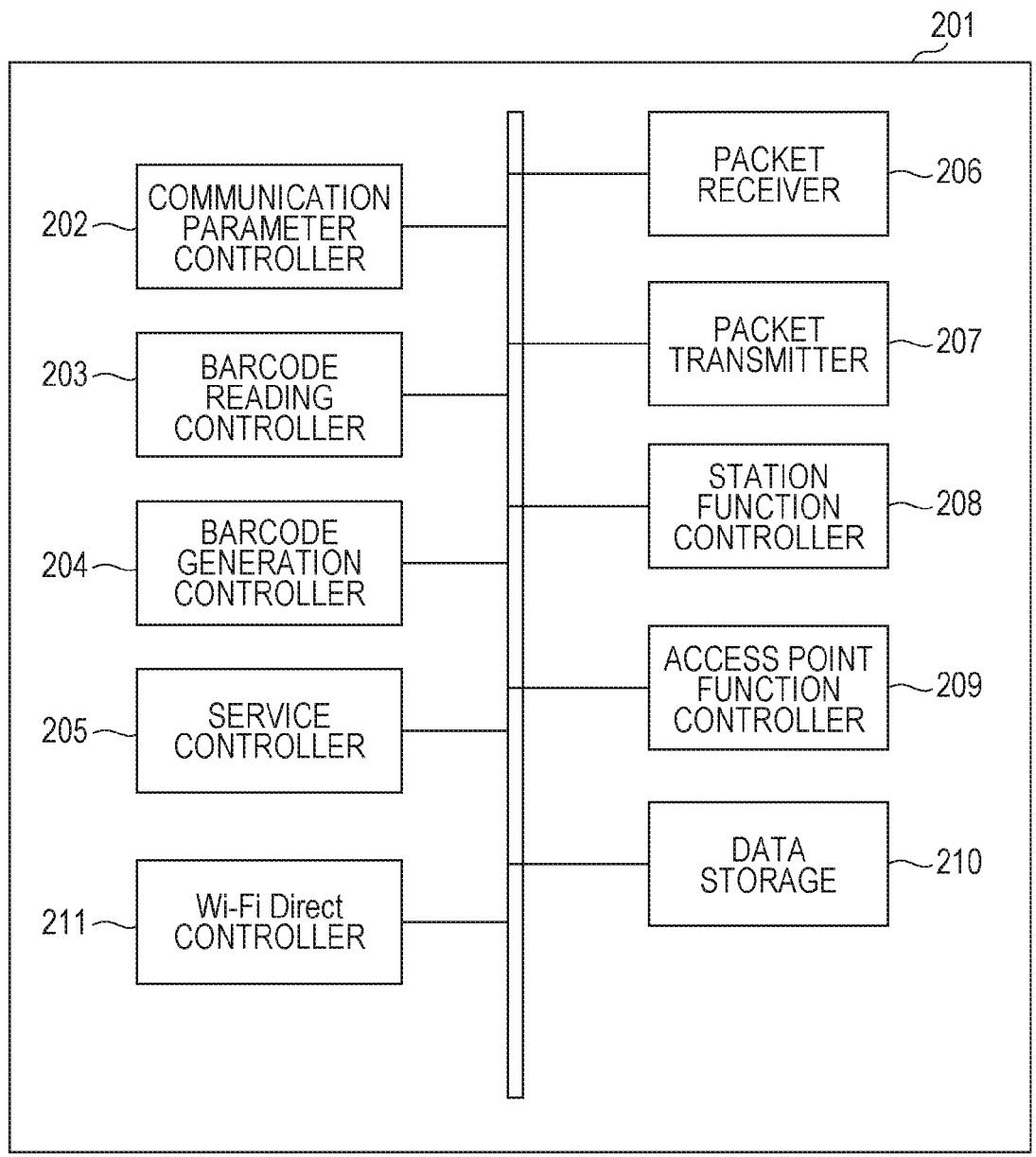

[Fig. 3]
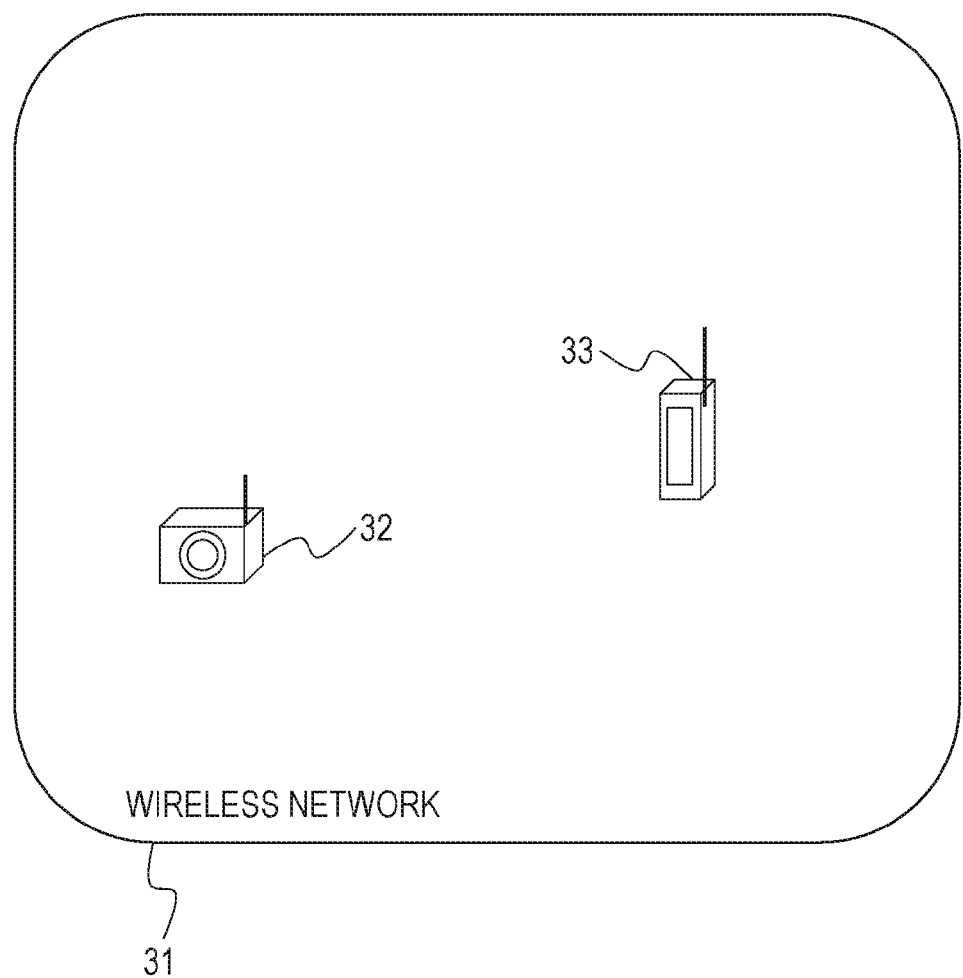

[Fig. 4]
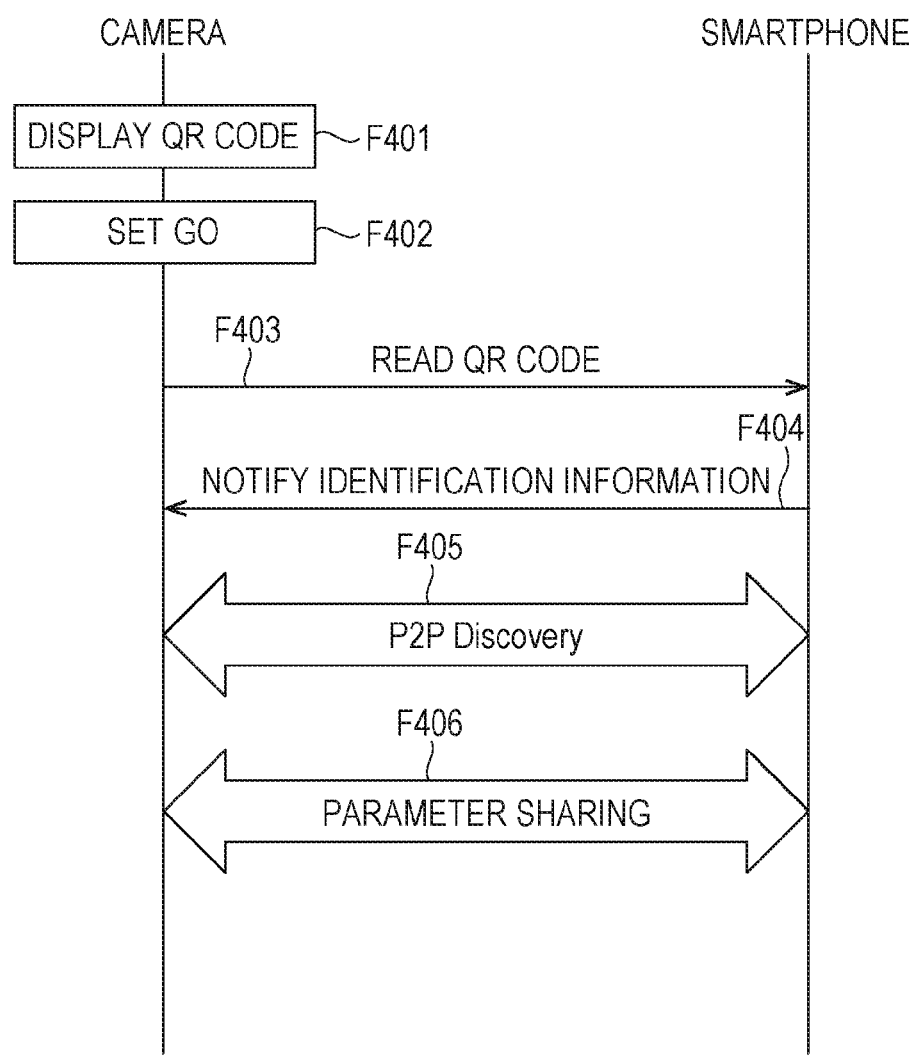

[Fig. 5]
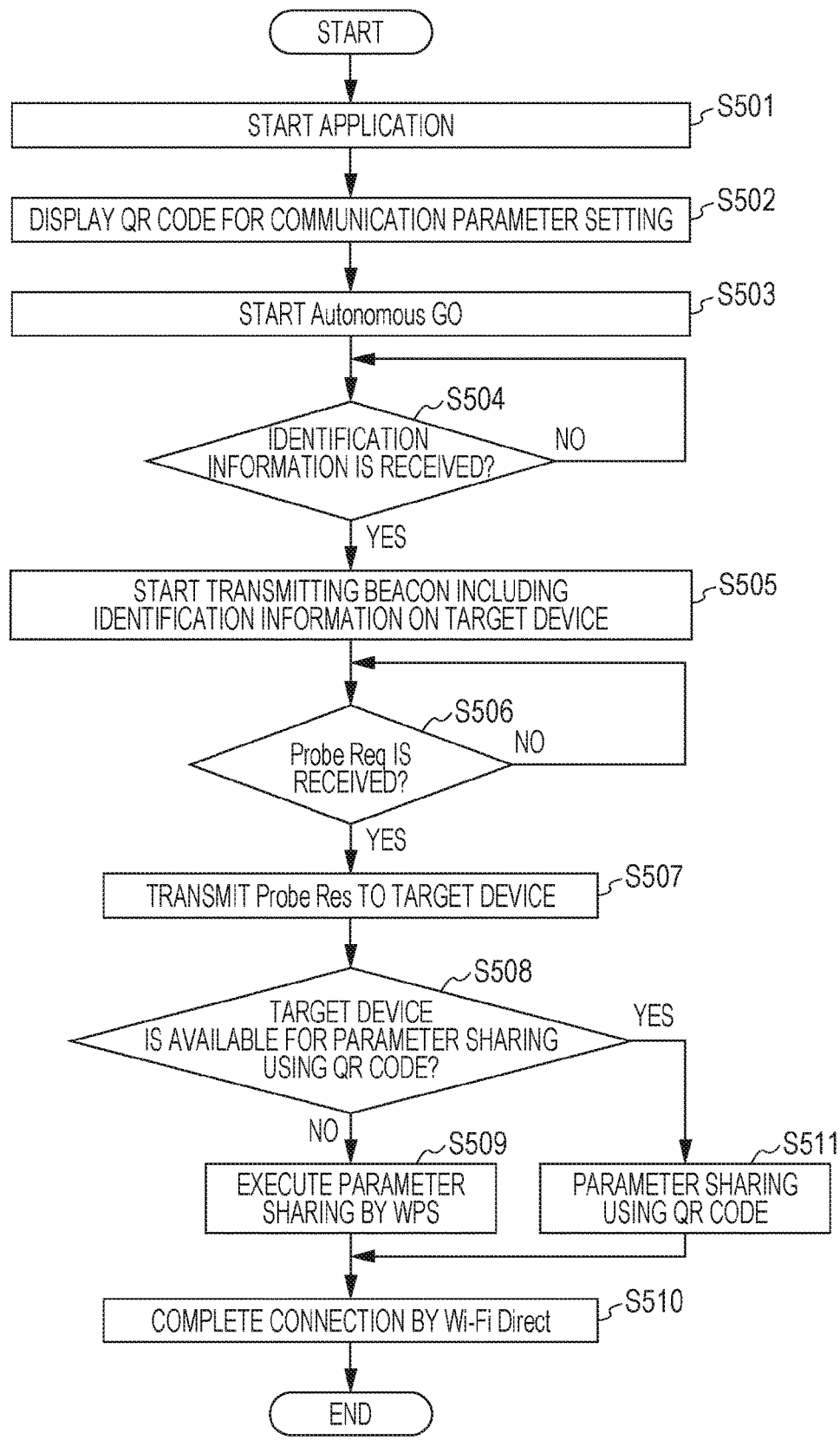

[Fig. 6]
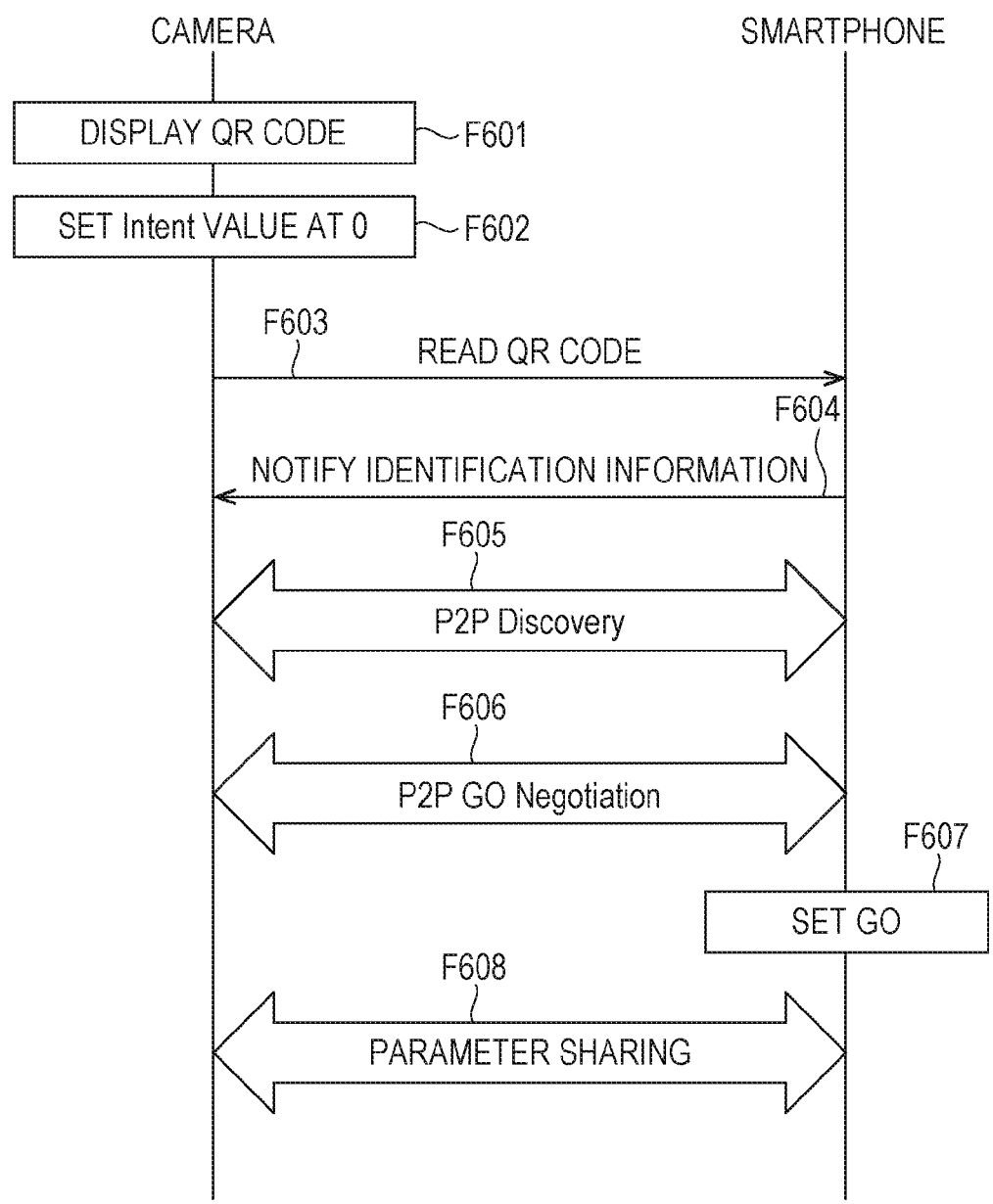

[Fig. 7]
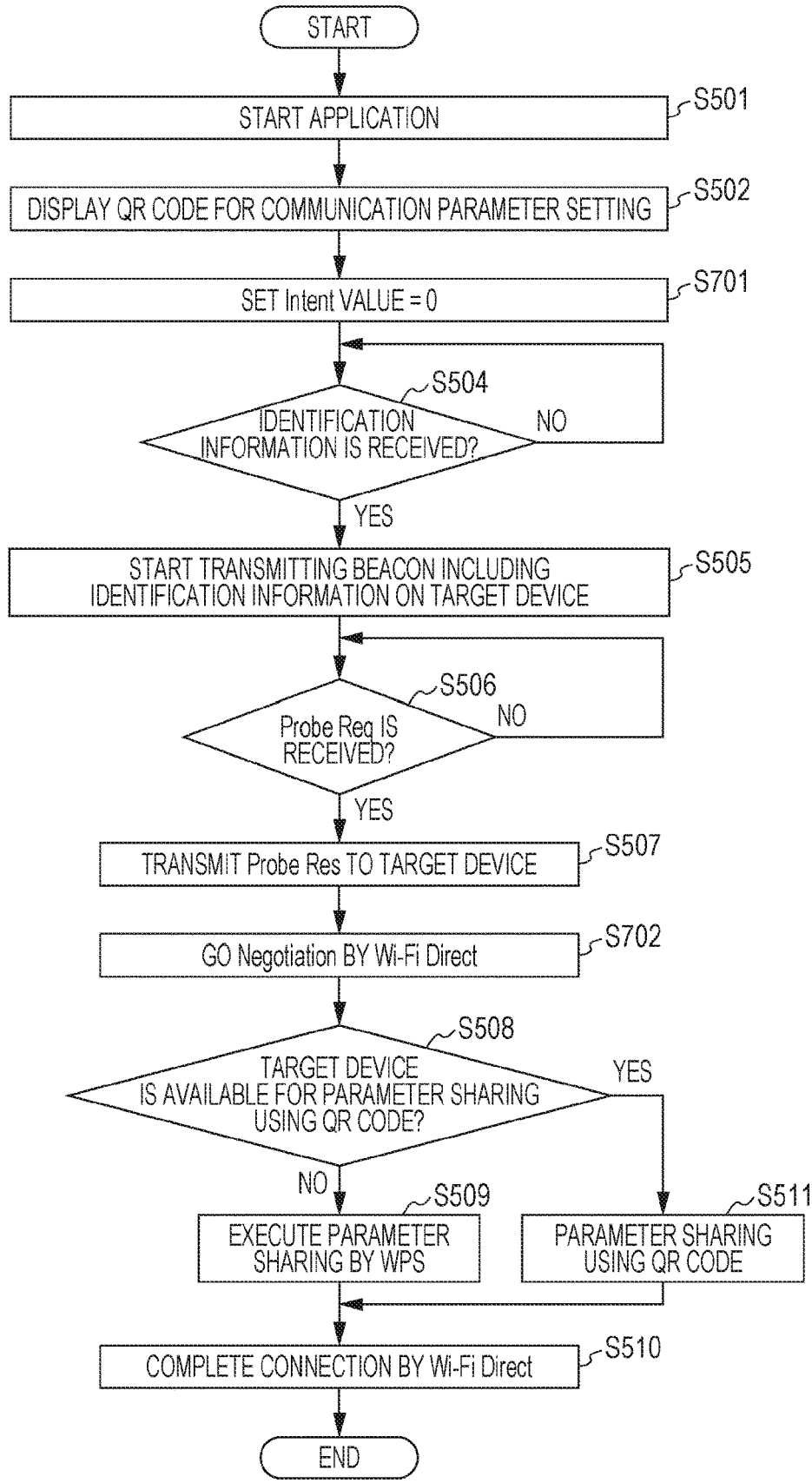

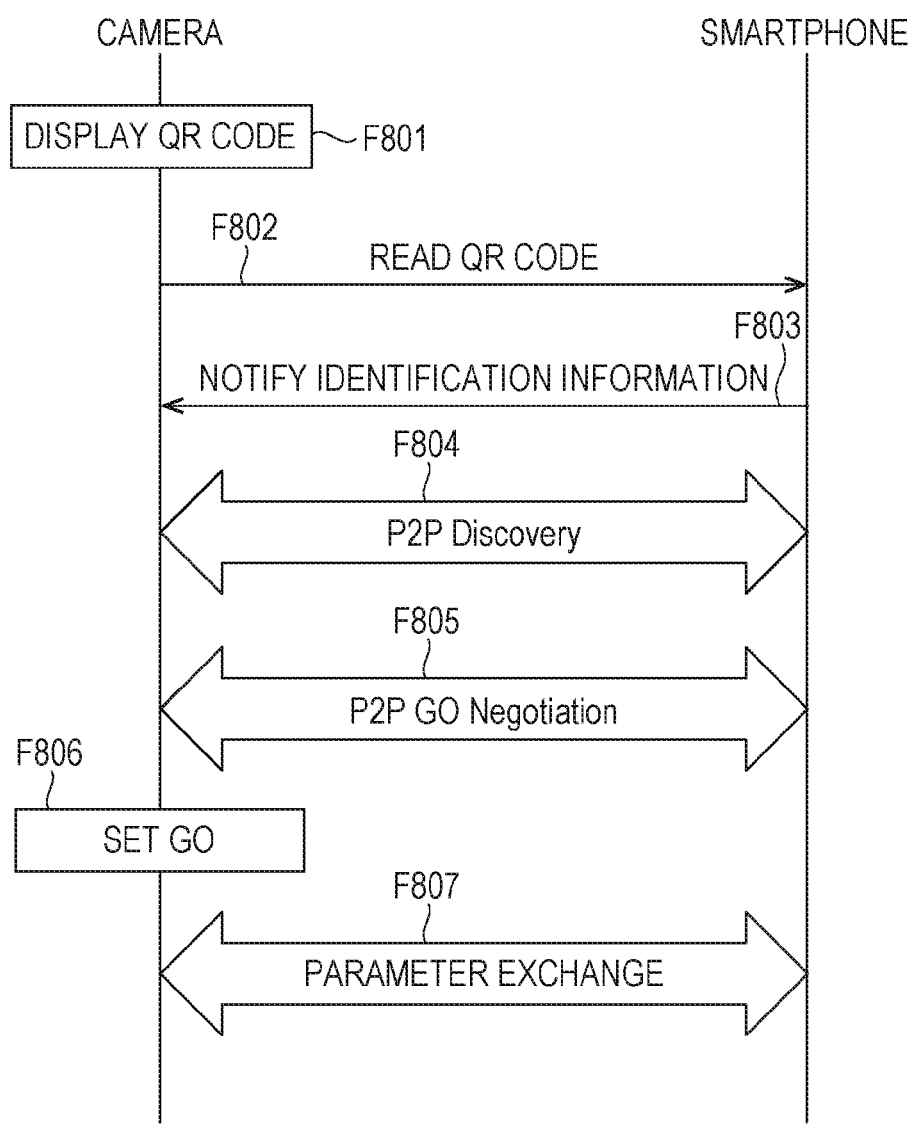

[Fig. 9]
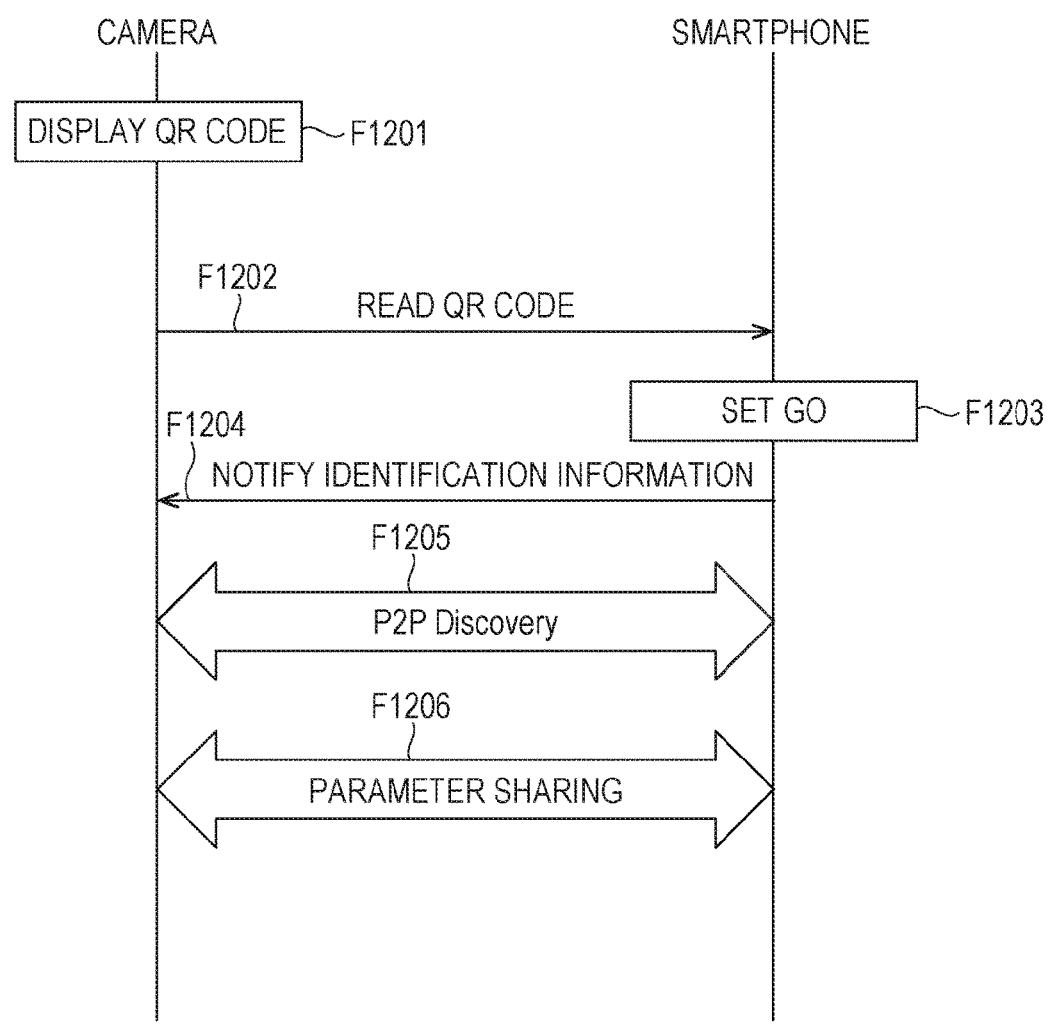

SETTING A COMMUNICATION PARAMETER FOR CONNECTING TO A WIRELESS NETWORK BETWEEN A BASE STATION AND A SLAVE STATION WHEREIN A COMMUNICATION DEVICE COMMUNICATES IN THE ROLE OF A BASE STATION BASED ON THE COMMUNICATION DEVICE DISPLAYING AN IMAGE

TECHNICAL FIELD

The present invention relates to a communication technology.

BACKGROUND ART

In recent years, a case increases in which an electronic device, such as a digital camera, a printer, a cell phone, or a smartphone, has a wireless communication function and is connected to a wireless network for use.

To connect the electronic device to the wireless network, it is required to set at least one of various communication parameters, such as an encryption method, an encryption key, an authentication method, and an authentication key. As a technology to make setting of such a communication parameter easy, there is a technology disclosed in PTL 1. In PTL 1, an electronic device displays a Quick Response code (QR code, registered trademark, this note will be omitted hereinafter) indicative of a communication parameter. A cell phone reads the QR code by capturing the image of the QR code, and sets the read communication parameter at an access point.

Also, to directly connect electronic devices with one another, connection processing called Wi-Fi Direct (registered trademark, this note will be omitted hereinafter) established by Wi-Fi Alliance is defined as a standard. In Wi-Fi Direct, there are two roles of a group owner that operates as a base station and a client that operates as a slave station. Each electronic device determines a role to be used in communication.

As described in PTL 1, by setting a communication parameter upon capturing of code information such as a two-dimensional code that can code much information, troublesome input by a user can be reduced.

Wi-Fi Direct defines that setting a communication parameter by Wi-Fi Direct is executed by communication parameter sharing processing called Wi-Fi Protected Setup (WPS) established by Wi-Fi Alliance. However, in case of communication parameter sharing between devices by a connection technology between devices, such as Wi-Fi Direct, for example, it is not considered to apply a method of executing communication parameter sharing processing upon capturing of an image like PTL 1.

For example, in a connection technology between devices, such as Wi-Fi Direct, if communication parameter sharing processing using information on a captured image is executed between devices like PTL 1, it is required to determine the roles of a device that executes image capturing and a device that displays a QR code. In Wi-Fi Direct, the role of the group owner or client has to be determined. Hence, in a connection technology between devices, such as Wi-Fi Direct, if communication parameter sharing processing using information on a captured image is executed, it is required to individually make a plurality of kinds of determination, such as determination on the role whether the base station or the slave station and determination on the role whether to execute image capturing or not. In this way, if a plurality of kinds of determination, such as determination on the role whether the base station or the slave station and determination on the role whether to execute image capturing or not, are individually made, it takes a time until connection, and a processing load may be increased.

CITATION LIST

Patent Literature

PTL 1: Japanese Patent Laid-Open No. 2014-60623

SUMMARY OF INVENTION

Solution to Problem

To address the above-described problems, a communication device according to the present invention includes a sharing unit configured to share a communication parameter for establishment of wireless connection with a communication target device by first sharing processing executed on the basis of information acquired from a captured image; and a determining unit configured to, if the sharing unit executes the first sharing processing, determine whether the communication device makes communication as a first role that operates as a base station or the communication device makes communication as a second role that operates as a slave station connected to a wireless network constructed by the base station, in accordance with whether or not the communication device captures the image used for the first sharing processing. The communication device establishes the wireless connection with the communication target device on the basis of the communication parameter shared by the sharing unit, and communicates with the communication target device in accordance with the role determined by the determining unit.

Further features of the present invention will become apparent from the following description of exemplary embodiments with reference to the attached drawings.

BRIEF DESCRIPTION OF DRAWINGS

FIG. 1 is an illustration showing a configuration of a communication device.

FIG. 2 is an illustration showing a software functional configuration of the communication device.

FIG. 3 is an illustration showing an example of a configuration of a communication system.

FIG. 4 is an illustration showing a sequence between communication devices according to a first embodiment.

FIG. 5 is a flowchart showing an operation of a camera according to the first embodiment.

FIG. 6 is an illustration showing an example of a sequence between communication devices according to a second embodiment.

FIG. 7 is a flowchart showing an operation of a camera according to the second embodiment.

FIG. 8 is an illustration showing a sequence between communication devices according to a third embodiment.

FIG. 9 is an illustration showing an example of a sequence between communication devices according to a modification of the second embodiment.

DESCRIPTION OF EMBODIMENTS

Embodiments described below each allow processing of determining a role whether to execute image capturing or not and determining a role whether a base station or a slave station to be easily executed in communication parameter sharing processing executed on the basis of information acquired from a captured image.

First Embodiment

A communication device according to this embodiment is described below in detail with reference to the drawings. Described below is an example using a wireless local area network (LAN) system conforming to The Institute of Electrical and Electronics Engineers, Inc. (IEEE) 802.11 series. However, the communication form is not necessarily limited to the wireless LAN conforming to IEEE 802.11.

FIG. 3 shows a communication system of this embodiment. The communication system shown in FIG. 3 includes a camera 32 and a smartphone 33. It is to be noted that a wireless network 31 is a wireless LAN network formed by the camera 32 or the smartphone 33 on the basis of Wi-Fi Direct. Devices in the communication system according to this embodiment are described as a camera and a smartphone. However, the devices may be other devices, for example, a printer, a cell phone, a personal computer (PC), a video camera, a smart watch, or a personal digital assistant (PDA).

Now, Wi-Fi Direct is described, Wi-Fi Direct is a standard established by Wi-Fi Alliance. Wi-Fi Direct defines a connection sequence for wireless LAN communication such that a communication device retrieves a communication target and forms a communication group with the retrieved communication target.

In Wi-Fi Direct, a communication device that operates as a wireless LAN access point is called P2P group owner (hereinafter, referred to as GO), and a communication device that operates as a wireless LAN station is called P2P client (hereinafter, referred to as CL). That is, in Wi-Fi Direct, GO operates as a base station, and CL operates as a slave station. These roles are determined by GO Negotiation protocol, and are defined by Wi-Fi Direct. Then, the device that executes Wi-Fi Direct operates as determined one of the roles, and wireless connection and wireless communication are made between the devices. That is, Wi-Fi Direct defines a plurality of roles. Wi-Fi Direct is connection processing including a process of determining roles of devices when communication is made between the devices.

It is to be noted that, in Wi-Fi Direct, a network formed by GO is called P2P group. Also in this specification, a network may be occasionally described as P2P group. A network and a P2P group are described with the same meaning.

It is to be noted that, in this specification, GO, CL, and a group of communication devices with roles undetermined are collectively called P2P device. A P2P device can participate in a wireless network (CL function) and construct a wireless network (GO function).

Also, when connection is made between devices by using Wi-Fi Direct, Go provides a communication parameter to CL, and connection is made between the devices by using the communication parameter. The communication parameter includes various kinds of wireless communication parameters for wireless communication conforming to IEEE 802.11 standard. That is, the communication parameter includes wireless communication parameters required for executing wireless LAN communication, such as a service set identifier (SSID) as a network identifier, an encryption method, an encryption key, an authentication method, and an authentication key. Also, a media access control (MAC) address and an Internet protocol (IP) address for making communication in an IP layer may be included.

Then, a hardware configuration according to this embodiment of each device (the camera 32, the smartphone 33) of the communication system shown in FIG. 3 is described with reference to FIG. 1. In FIG. 1, reference sign 101 denotes the entire device. Reference sign 102 is a control unit that controls the entire device by executing a control program stored in a storage unit 103. The control unit 102 is configured of, for example, a central processing unit (CPU). Reference sign 103 denotes the storage unit that stores various pieces of information, such as the control program executed by the control unit 102, image data, and a communication parameter. Respective operations (described later) are performed by the control unit 102 executing the control program stored in the storage unit 103. The storage unit 103 is configured of, for example, a hard disk drive (HDD), a flash memory, a read-only memory (ROM), a random access memory (RAM), or a removable storage medium such as a secure digital (SD) card.

Reference sign 104 denotes a wireless unit configured to execute wireless LAN communication conforming to IEEE 802.11 series. The wireless unit 104 is configured of a chip that executes wireless communication. Reference sign 105 denotes a display unit that executes displaying in various forms, and that has a function capable of outputting visually recognizable information by using, for example, a liquid crystal display (LCD) or a light-emitting diode (LED), or outputting sound by using, for example, a loudspeaker. The display unit 105 has a function of outputting at least one of visual information and sound information. If the display unit 105 displays visual information, the display unit 105 has a video RAM (VRAM) that holds image data corresponding to the visual information to be displayed. The display unit 105 executes display control that causes the LCD to continuously display image data stored in VRAM.

Reference sign 106 denotes an image capturing unit that is configured of an image capturing element, a lens, etc., and that captures a photo and/or a movie. In this embodiment, the image capturing unit 106 reads code information, such as a barcode, a two-dimensional code, or a QR code.

Reference sign 107 denotes an antenna control unit that executes output control of an antenna 108. Reference sign 108 denotes the antenna available for communication in 2.4 GHz band and/or 5 GHz band for communication through wireless LAN.

Reference sign 109 denotes an input unit configured to operate the communication device 101 by a user making various kinds of input. The input unit 109 stores a flag corresponding to an input in a memory such as the storage unit 103.

FIG. 2 is a block diagram showing an example of a configuration of a software functional block that executes a communication control function (described later). In this embodiment, functional blocks of each device are stored as programs in the storage unit 103, and the functions are provided by executing the programs by the control unit 102. The control unit 102 realizes each function by controlling each hardware, and arithmetically operating and processing information, according to the control program. A portion included in or the entirety of the functional blocks may be provided as hardware. In this case, a portion included in or the entirety of the respective functional blocks are configured of, for example, an application specific integrated circuit (ASIC).

In FIG. 2, reference sign 201 denotes the entire software functional block. Reference sign 202 denotes a communication parameter controller. The communication parameter controller 202 executes communication parameter sharing processing for sharing a communication parameter between devices. In the communication parameter sharing processing, a provider device provides a communication parameter for wireless communication to a receiver device. In this case, the communication parameter includes wireless communication parameters required for executing wireless LAN communication, such as a service set identifier (SSID) as a network identifier, an encryption method, an encryption key, an authentication method, and an authentication key. Also, a MAC address, a pass phrase, an IP address for communication in an IP layer, and information required for high-order service may be included. The communication parameter sharing processing executed by the communication parameter controller 202 may be Wi-Fi protected setup (WPS) established by Wi-Fi Alliance. Also, the communication parameter sharing processing executed by the communication parameter controller 202 may be a method of transferring a communication parameter with safety by using public-key cryptosystem. Processing of transmitting/receiving a communication parameter between at least two communication devices is executed by the communication parameter controller 202. The communication parameter controller 202 executes communication parameter setting in accordance with a communication parameter setting application for setting a communication parameter that is stored in the storage unit 103.

Reference sign 203 is a barcode reading controller. The barcode reading controller 203 analyzes the image captured by the image capturing unit 106 and acquires coded code information. The barcode reading controller 203 executes analysis processing on code information including a one-dimensional code such as a barcode, and a two-dimensional code such as a QR code.

Reference sign 204 is a barcode generation controller. The barcode generation controller 204 generates code information, such as a barcode, a two-dimensional code, or a QR code, and controls the display unit 105 to display the generated code information. The barcode generation controller 204 causes a QR code in which information required for communication parameter setting is coded to be displayed in accordance with the communication parameter setting application for setting the communication parameter that is stored in the storage unit 103.

Reference sign 205 is a service controller in an application layer. In this case, the application layer is a service providing layer in an upper layer included in at least five layers in the Open Systems Interconnection (OSI) reference model. That is, the service controller 205 executes, print processing, image streaming processing, file transfer processing, etc., by using wireless communication by the wireless unit 104.

Reference sign 206 denotes a packet receiver, and reference sign 207 denotes a packet transmitter. The packet receiver 206 and the packet transmitter 207 control transmission and reception of various packets including a communication protocol in an upper layer. Also, the packet receiver 206 and the packet transmitter 207 control the wireless unit 104 for transmitting and receiving packets conforming to IEEE 802.11 standard to and from a target device.

Reference sign 208 denotes a station (STA) function controller. The STA function controller 208 provides a STA function of operating as a station (STA) in an infrastructure mode defined by IEEE 802.11 standard. The STA function controller 208 executes authentication and encryption processing etc. when operating as STA.

Reference sign 209 denotes an access point (AP) function controller. The AP function controller 209 provides an AP function of operating as an access point (AP) in the infrastructure mode defined by IEEE 802.11 standard. The AP function controller 209 forms a wireless network, executes authentication and encryption processing on STA, and manages STA. Reference sign 210 denotes a data storage. The data storage 210 controls writing and reading of information, such as a communication parameter and a barcode or the like, in and from the storage unit 103.

Reference sign 211 is a Wi-Fi Direct controller. The Wi-Fi Direct controller 211 executes various processing based on Wi-Fi Direct. The Wi-Fi Direct controller 211 functions as AP by the AP function controller 209 if operating as GO, and functions as STA by the STA function controller 208 if operating as CL.

An operation of the communication system having the above-described configuration is described. FIG. 4 shows a connection sequence by Wi-Fi Direct using a QR code between the communication devices of the camera 32 and the smartphone 33. In FIG. 4, when the camera 32 displays a QR code, the camera 32 activates the own device as GO of Wi-Fi Direct.

The camera 32 causes a QR code including information required for setting a communication parameter to be displayed on the display unit 105 of the own device in accordance with an operation by a user. The camera 32 displays the QR code including the information required for setting the communication parameter if the communication parameter setting mode is instructed by the user (F401). Alternatively, if the communication parameter setting mode is set, the camera 32 may allow a user to select displaying the QR code or capturing a QR code of another device in accordance with an operation by the user. In this case, it is assumed that the camera 32 is instructed by the user to display the QR code.

In response to displaying of the QR code, the camera 32 starts communication control by Wi-Fi Direct, and sets the operation mode of the own device as GO of Wi-Fi Direct (F402).

When the smartphone 33 receives an instruction for wireless connection from a user, the smartphone 33 shifts to a mode available for image capturing with the image capturing unit 106. If the communication parameter setting mode is set, the smartphone 33 may allow the user to select displaying a QR code or capturing a QR code of another device in accordance with an operation by the user. In this case, it is assumed that the smartphone 33 is instructed by the user to capture the QR code.

When the smartphone 33 shifts to the mode available for image capturing, the smartphone 33 reads the QR code displayed on the camera 32 by the image capturing unit 106 of the smartphone 33 (F403). The smartphone 33 decodes the read QR code, and acquires information indicated by the QR code. The smartphone 33 judges whether or not the information acquired form the QR code is information required for setting the communication parameter.

In this case, the information required for setting the parameter is information used for encryption when the communication parameter is transmitted/received, and identification information on a device. The information used for encryption when the communication parameter is transmitted/received may be a public key or a certification. It is to be noted that a method of encrypting and transmitting/receiving a communication parameter by using a public key in the communication parameter sharing processing may use, for example, a method described in Japanese Patent Laid-Open No. 2014-230152. It is assumed that the encryption communication executed on the basis of encryption information included in a QR code has a higher encryption strength and a higher security level than those of encryption communication when a communication parameter is transmitted/received by WPS. The encryption strength is higher as the number of bits of the encryption key length is larger.

The identification information on the device included in the QR code may be a MAC address or a universally unique identifier (UUID) that uniquely identifies a device. The information required for setting the communication parameter may be an identifier indicative of the communication parameter sharing processing. Identification information such as a one-time password method using a QR code may be included.

Further, the QR code may include capability (characteristic, ability, license, performance) information such as role information in execution of Wi-Fi Direct. The role information in execution of Wi-Fi Direct may be, for example, an Intent value used for negotiation processing for determining GO between devices. In addition, the QR code may include ability information on each device, and information specific to the device for wireless LAN connection. If the QR code does not include the information required for setting the communication parameter, the smartphone 33 may terminate the processing in error.

When the smartphone 33 acquires the information required for setting the communication parameter by image capturing, the smartphone 33 notifies the camera 32 identified by the identification information included in the captured QR code about the identification information on the own device (F404). In this case, the identification information notified by the smartphone 33 is information required for specifying a transmission target when the camera 32 transmits a packet for communication parameter setting. For example, the identification information notified by the smartphone 33 may be information specific to a device, such as a MAC address, a basic service set identifier (BSSID), or QUID. Also, the smartphone 33 may make notification in F404 by adding the information included in the captured QR code. By receiving the information included in the displayed QR code, the camera 32 can recognize that the smartphone 33 is a device that captured the QR code. The notification in F404 may be transmitted to all channels.

The smartphone 33 and the camera 32 can recognize one another by acquisition of the identification information on the camera 32 by image capturing the QR code with the smartphone 33, and by notification of the identification information on the own device from the smartphone 33 to the camera 32. Accordingly, by executing device retrieval processing (P2P Discovery) defined by Wi-Fi Direct, the smartphone 33 which has captured the QR code can detect the camera 32 which has displayed the QR code by wireless communication (F405). In this case, the device retrieval processing is processing in Find Phase defined by Wi-Fi Direct. The smartphone 33 starts Find Phase in response to image capturing of the QR code or an instruction by the user. In Find Phase, first, all channels are scanned by using a retrieval signal added with an information element indicating availability of Wi-Fi Direct. Then, if a desirable communication target cannot be detected by all channel scanning, processing of scanning 1, 6, and 11 ch by using the retrieval signal, and processing of waiting for the retrieval signal from a communication target through any one of 1, 6, and 11 ch are alternately executed. Scanning in this case may use active scanning or/and passive scanning defined by IEEE 802.11 standard.

Also, the camera 32 that operates as GO sets the wireless network to be constructed, in any of 1, 6, and 11 ch. Therefore, even when the camera 32 cannot be detected by all channel scanning executed by the smartphone 33, the smartphone 33 can detect the camera 32.

Alternatively, the camera 32 may construct a wireless network in a channel other than 1, 6, and 11 ch if the smartphone 33 attempts to execute all channel scanning after the notification in F404.

Also, the camera 32 may add the identification information on a transmission source of the information received in F404 to a beacon that is periodically transmitted in case of GO and transmit the beacon. In this way, since the device that displays the QR code serves as GO, and the device that captures the QR code periodically transmits the identification information, possibility that both devices detect one another can be increased.

The retrieval signal transmitted by the smartphone 33 may include information that designates the identifier of the camera 32 being information included in the QR code. The camera 32 and the smartphone 33 may transmit the retrieval signal added with the information element indicative of conformance to the communication parameter sharing processing using image capturing of the QR code, and a response signal for the retrieval signal.

After the camera 32 and the smartphone 33 detect one another, the communication parameter sharing processing is executed between the camera 32 and the smartphone 33 (F406). The communication parameter sharing processing in this case is not limited to WPS, and may be a method executed on the basis of the encryption information used for the encryption during transmitting/receiving the communication parameter included in the QR code. A selection method for the communication parameter sharing processing executed between the camera 32 and the smartphone 33 is described later.

An operation when the camera 32 executes P2P group formation processing is described next with reference to a flowchart in FIG. 5. The flowchart in FIG. 5 is started after start of P2P group formation by Wi-Fi Direct is instructed by the user through the input unit 109.

Also, the flowchart shown in FIG. 5 shows a flow of processing performed by the control unit 102 by reading a computer program stored in the storage unit 103 and executing the computer program. A portion or the entirety of steps in the flowchart shown in FIG. 5 may be realized by hardware such as ASIC.

The camera 32 is set in the communication parameter setting mode and activates the communication parameter setting application in response to an operation on the input unit 109 by the user (S501). After the application is activated, the camera 32 causes the display unit 105 to display the QR code including the information required for setting the communication parameter (S502).

After the camera 32 displays the QR code, the camera 32 starts an operation while the own device serves as Autonomous GO of Wi-Fi Direct (S503). Autonomous GO determines the role as GO without GO Negotiation protocol of Wi-Fi Direct.

The camera 32 activated as GO constructs a wireless network and starts transmitting a beacon. The camera 32 activated as GO can wait for identification information from a target device and information indicative of that the target device has captured the QR code in the constructed wireless network. The camera 32 judges whether or not the camera 32 has received the information indicative of that the target device has captured the QR code and the identification information on the target device, from the target device (in this embodiment, the smartphone) that has captured the QR code (S504). If the camera 32 has not received the information indicative of that the target device has not captured the QR code or the identification information on the target device when a predetermined period (for example, two minutes) has elapsed after the QR code is displayed, the camera 32 may terminate the processing in error.

If the camera 32 has received the information indicative of that the target device has captured the QR code and the identification information on the target device from the target device (in this embodiment, the smartphone) that has captured the QR code, the camera 32 starts transmitting the beacon including the identification information (S505). In this way, since the camera 32 transmits the identification information on the device which has captured the QR code on the beacon that is periodically transmitted, the target device which has executed image capturing can easily detect the camera 32.

Then, the camera 32 waits for reception of Probe Req (probe request) being a retrieval signal defined by IEEE 802.11 from the target device (S506). If the camera 32 has not received Probe Req from the device which has captured the QR code when a predetermined period has elapsed after the QR code is displayed, the camera 32 may terminate the processing in error.

The information indicative of that the target device has captured the QR code and the identification information on the target device, and Probe Req are received on different signals. However, these pieces of information may be received on a single signal. That is, the device which has captured the QR code may transmit Probe Req including the information indicative of that the target device has captured the QR code.

The camera 32 makes a response of Probe Res (probe response) being a signal defined by IEEE 802.11 and being a response signal to Probe Req, from the device indicated by the identification information received in S504 (S507). The camera 32 transmits Probe Res to be transmitted in S507 by adding an information element indicative of conformance to the communication parameter sharing processing using the QR code.

The camera 32 recognizes the information element (IE) included in Probe Req received in S506, and judges whether or not the target device conforms to the communication parameter sharing processing using the QR code (S508). If the target device conforms to the communication parameter sharing processing using the QR code, IE indicative of conformance to the communication parameter sharing processing using the QR code is included in Probe Req. That is, the target device transmits Probe Req including IE indicative of conformance to the communication parameter sharing processing using the QR code in addition to IE indicative of Wi-Fi Direct (P2P IE) and IE indicative of WPS (WSC IE).

In this way, the camera 32 can judge whether or not the target device conforms to the communication parameter sharing processing using the QR code on the basis of the information element included in received Probe Req.

If the camera 32 judges that the target device conforms to the communication parameter sharing processing using the QR code, the camera 32 determines to execute the communication parameter sharing processing using the QR code with the target device. Also, if the camera 32 determines that the target device does not conform to the communication parameter sharing processing using the QR code, that is, if the target device conforms to only the WPS protocol, the camera 32 determines to execute the communication parameter sharing processing by the WPS protocol.

In this case, the camera 32 judges whether or not the target device conforms to the communication parameter sharing processing using the QR code; however, the camera 32 may judge whether or not the target device conforms to another method. If the camera 32 judges that plural kinds of communication parameter sharing processing can be executed between the own device and the target device, the camera 32 may automatically select, for example, a method with the highest security level. If the camera 32 judges that plural kinds of communication parameter sharing processing can be executed between the own device and the target device, the camera 32 may select a method to be executed with the target device in accordance with an operation by the user.

In this embodiment, the camera 32 executes the communication parameter sharing processing using the QR code with a higher encryption strength and a higher security level when the communication parameter is transmitted/received than that of the WPS protocol with high priority. However, the camera 32 may execute the communication parameter sharing processing using the QR code with high priority given to the WPS protocol.

If the camera 32 judges that the target device does not conform to the communication parameter sharing processing using the QR code, the camera 32 executes the communication parameter sharing processing by the WPS protocol (S509). In this case, since the camera 32 operates as GO, the camera 32 as a registrar (a provider device) provides the communication parameter for making communication in the constructed wireless network to the target device.

Also, if the camera 32 judges that the target device conforms to the communication parameter sharing processing using the QR code, the camera 32 executes the communication parameter sharing processing using the QR code instead of executing the communication parameter sharing processing by the WPS protocol (S511). In this case, the communication parameter sharing processing using the QR code represents encrypting the communication parameter with use of the encryption information in the QR code and transferring the communication parameter from the camera 32 to the smartphone 33 or transferring the communication parameter from the smartphone 33 to the camera 32. In this case, since the camera 32 operates as GO, the camera 32 provides the communication parameter for making communication in the constructed wireless network to the target device.

After parameter sharing for Wi-Fi Direct connection is completed between the camera 32 and the smartphone 33 in S509 or S511, the camera 32 and the smartphone 33 establish wireless connection by Wi-Fi Direct (S510).

As described above, since the device that displays the QR code executes the processing as the group owner of Wi-Fi Direct, the two devices can be easily connected with one another by Wi-Fi Direct.

In this embodiment, the camera 32 displays the QR code in response to the instruction for start of P2P group formation processing. However, the QR code may be displayed when it is judged that the target device conforms to the communication parameter sharing processing using the QR code. That is, the camera 32 may start normal processing by Wi-Fi Direct, and may start displaying of the QR code if information transmitted from the detected target device includes IE indicative of conformance to the communication parameter sharing processing using the QR code.

Also, the smartphone 33 may start normal processing by Wi-Fi Direct, and may start capturing of the QR code if the information transmitted from the detected target device includes IE indicative of conformance to the communication parameter sharing processing using the QR code.

With this embodiment, in Wi-Fi Direct, the communication parameter sharing processing to which the target device conforms can be recognized, and the communication parameter sharing processing to be executed can be selected from a plurality of methods. With this embodiment, in Wi-Fi Direct, since the communication parameter sharing processing with higher security than WPS can be selected, security and usability can be increased.

Also, with this embodiment, since the device that displays the QR code operates as GO, it is no longer required to make determination on the role whether GO or CL, and determination on the role whether to display or capture the QR code. Hence, since the role is determined as GO or CL in association with the determination on the role whether to display or capture the QR code, the operation and processing for determining the role can be reduced.

In the above description, the camera 32 determines to operate as GO if the camera 32 takes the role of displaying the QR code. However, the smartphone 33 that takes the role of capturing the QR code may determine to operate as CL. Alternatively, the camera 32 may determine to operate as CL if the camera 32 takes the role of capturing the QR code, or the smartphone 33 may determine to operate as GO if the smartphone 33 takes the role of displaying the QR code.

Second Embodiment

In the first embodiment, the case in which the device that displays the QR code operates as GO of Wi-Fi Direct is described. However, in this embodiment, a case in which the device that captures the QR code operates as GO of Wi-Fi Direct is described. The configurations of the respective devices are similar to those in the first embodiment.

FIG. 6 shows a connection sequence by Wi-Fi Direct using a QR code between the communication devices of the camera 32 and the smartphone 33. In FIG. 4, when the camera 32 displays the QR code, the camera 32 activates the own device as a client (hereinafter, referred to as CL) of Wi-Fi Direct.

The camera 32 causes a QR code including information required for setting a communication parameter to be displayed on the display unit 105 of the own device in accordance with an operation by a user. The camera 32 displays the QR code including the information required for setting the communication parameter if the communication parameter setting mode is instructed by the user (F601). Also, if the communication parameter setting mode is set, the camera 32 may allow the user to select displaying the QR code or capturing a QR code of another device in accordance with an operation by the user. In this case, it is assumed that the camera 32 is instructed by the user to display the QR code.

In response to displaying the QR code, the camera 32 sets the Intent value at 0 to be CL (F602). In Wi-Fi Direct, GO Negotiation for determining a device to be GO defines that Intent values are exchanged between devices, a device with a larger value becomes GO and a device with a smaller value becomes CL. Also, Wi-Fi Direct defines that the Intent value is in a range from 0 to 15. Hence, the camera 32 sets the Intent value at 0 being the minimum value and executes negotiation for determining the role.

When the smartphone 33 receives an instruction for wireless connection by the user, the smartphone 33 shifts to a mode available for image capturing with the image capturing unit 106. If the communication parameter setting mode is set, the smartphone 33 may allow the user to select displaying the QR code or capturing a QR code of another device in accordance with an operation by the user. In this case, it is assumed that the smartphone 33 is instructed by the user to capture the QR code.

When the smartphone 33 shifts to the mode available for image capturing, the smartphone 33 reads the QR code displayed on the camera 32 by the image capturing unit 106 of the smartphone 33 (F603). The smartphone 33 decodes the read QR code, and acquires information indicated by the QR code. The smartphone 33 judges whether or not the information acquired form the QR code is information required for setting the communication parameter. If the QR code does not include the information required for setting the communication parameter, the smartphone 33 may terminate the processing in error.

When the smartphone 33 acquires the information required for setting the communication parameter by image capturing, the smartphone 33 notifies the camera 32 identified by identification information included in the captured QR code about identification information on the own device (F604). The notification in F604 may be transmitted to all channels.

The smartphone 33 and the camera 32 execute device retrieval processing defined by Wi-Fi Direct, and detect one another (F605). The smartphone 33 and the camera 32 execute GO Negotiation defined by Wi-Fi Direct, which is negotiation for determining the role whether GO or CL (F606), Since the Intent value of the camera 32 is set at 0 in F602, in the negotiation in F606, it is determined that the camera 32 operates as CL and the smartphone 33 operates as GO (F607).

If the Intent value of the target device (the smartphone 33) is also at 0 being the minimum value, the camera 32 may terminate the processing in error once, and may execute negotiation for determining the role again. Also, in Direct, to prepare for a case in which devices have the same Intent value, a message for exchanging the Intent value includes a randomly generated bit called Tie breaker bit. The device that transmits the Intent value later establishes a bit inverted to Tie breaker hit in the message including the Intent value received from the target device. For example, if received Tie breaker bit in the message for exchanging the Intent value is "1," the device that transmits the Intent value later sets Tie breaker bit at "0" and transmits the Intent value. Also, if received Tie breaker hit in the message for exchanging the Intent value is "0," the device that transmits the Intent value later sets Tie breaker bit at "1" and transmits the Intent value.

Wi-Fi Direct defines that, in the case in which the devices have the same Intent value, the device with Tie breaker bit having the value of "1" operates as GO. Hence, the camera 32 may set Tie breaker bit at "0" and transmit the Intent value before the target device does to prepare for the case in which the target device also has the Intent value of 0 being the minimum value. Also, if the Intent value of the target device is 0 being the minimum vale and it is determined to operate as GO with regard to Tie breaker bit, the camera 32 may terminate the processing in error once, and may execute negotiation for determining the role again.

Then, the smartphone 33 being GO provides the communication parameter to the camera 32, and shares the communication parameter between the devices (F608).

An operation of the camera 32 according to this embodiment is described with reference to a flowchart in FIG. 7. The same processing as the processing in the flowchart in FIG. 5 described according to the first embodiment is indicated by the same reference sign, and the details of the description are omitted. FIG. 7 differs from FIG. 5 in that processing in S701 is executed instead of S503, and processing in S702 is added between S507 and S508.

The flowchart in FIG. 7 is started after start of P2P group formation by Wi-Fi Direct is instructed by the user through the input unit 109. Also, the flowchart shown in FIG. 7 shows a flow of processing performed by the control unit 102 reading a computer program stored in the storage unit 103 and executing the computer program. Alternatively, a portion or the entirety of steps in the flowchart shown in FIG. 7 may be realized by hardware such as ASIC.

If the camera 32 activates the communication parameter setting application and displays the QR code, the camera 32 sets the Intent value to operate as CL at 0 (S701).

Then, the camera 32 receives the identification information from the target device. If the camera 32 exchanges the retrieval signal and its response signal and detects the target device, executes GO Negotiation, in which the Intent value is set at 0, with the target device (S702). In response to this GO Negotiation, the camera 32 determines to operate as CL. Then, the camera 32 executes the communication parameter sharing processing using the WPS or QR code in accordance with the communication parameter sharing processing executable by the target device, and is connected with the target device by Wi-Fi Direct.

As described above, since control is executed so that the device that captures the QR code can execute the processing as the group owner of Wi-Fi Direct, the two devices can be easily connected by Wi-Fi Direct.

Also, a modification of this embodiment is described with reference to a sequence chart shown in FIG. 9. FIG. 9 shows an example in which the smartphone that captures the QR code operates as GO of Wi-Fi Direct.

The camera 32 causes a QR code including information required for setting a communication parameter to be displayed on the display unit 105 of the own device in accordance with an operation by a user. The camera 32 displays the QR code including the information required for setting the communication parameter if the communication parameter setting mode is instructed by the user (F1201).

When the smartphone 33 receives an instruction for wireless connection from a user, the smartphone 33 shifts to a mode available for image capturing with the image capturing unit 106. Then, the smartphone 33 reads the QR code displayed on the camera 32 with the image capturing unit 106 of the smartphone 33 (F1202). The smartphone 33 sets the operation mode of the device as GO of Wi-Fi Direct in response to capturing of the QR code (F1203). The smartphone 33 starts an operation as Autonomous GO of Wi-Fi Direct.

The smartphone 33 activated as GO transmits information included in the QR code and identification information on the own device by adding these pieces of information in a beacon (F1204). It is assumed that the smartphone 33 transmits the beacon to each of 1, 6, and 11 ch so that the camera 32 in Find Phase can receive the beacon. Alternatively, the transmission of the information in F1204 may be added in another signal instead of the beacon. By receiving the information included in the displayed QR code, the camera 32 can recognize that the smartphone 33 is a device that has captured the QR code.

The camera 32 detects the beacon of the smartphone 33 in Find Phase (F1205). The camera 32 transmits a signal for requesting the communication parameter to the smartphone 33. The communication parameter sharing processing is executed between the camera 32 and the smartphone 33 (F1206). In this case, the communication parameter sharing processing executed between the camera 32 and the smartphone 33 is not WPS, but is the communication parameter sharing processing using the QR code like the above description.

As described above, with this embodiment, the smartphone that executes image capturing becomes GO, and the information indicative of that the smartphone hone has captured the QR code is added to the beacon that is periodically transmitted. Accordingly, possibility that the device displaying the QR code detects the device capturing the QR code can be increased.

Also, with this embodiment, since the device that captures the QR code operates as GO, it is no longer required to make determination on the role whether GO or CL, and determination on the role whether to display or capture the QR code. Hence, since the role is determined as GO or CL in association with the determination on the role whether to display or capture the QR code, the operation and processing for determining the role can be reduced.

In the above description, the camera 32 determines to operate as CL if the camera 32 takes the role of displaying the QR code. However, the camera 32 may determine to operate as GO if the camera 32 takes the role of capturing the QR code. Alternatively, the camera 32 may determine to operate as CL if the smartphone 33 takes the role of displaying the QR code.

Third Embodiment

Described in the first and second embodiments is the case in which the device that displays the QR code fixes the role as the group owner or the client of Wi-Fi Direct and operates. Described in a third embodiment is a case in which the role of the communication device is determined by Go Negotiation protocol defined in Wi-Fi Direct. FIG. 8 shows a connection sequence by Wi-Fi Direct using a QR code between communication devices of the camera 32 and the smartphone 33 according to this embodiment.

In FIG. 8, the camera 32 causes a QR code including information required for setting a communication parameter to be displayed on the display unit 105 of the own device in accordance with an operation by a user. The camera 32 displays the QR code including the information required for setting the communication parameter if the communication parameter setting mode is instructed by the user (F801).

The smartphone 33 reads the QR code displayed on the camera 32 with the image capturing unit 106 of the smartphone 33 (F802). The smartphone 33 decodes the read QR code, and acquires information indicated by the QR code. The smartphone 33 judges whether or not the information acquired form the QR code is the information required for setting the communication parameter.

When the smartphone 33 acquires the information required for setting the communication parameter by image capturing, the smartphone 33 notifies the camera 32 identified by identification information included in the captured QR code about identification information on the own device (F803).

The smartphone 33 and the camera 32 execute device retrieval processing defined by Wi-Fi Direct, and detect one another (F804). Then, GO Negotiation defined by Wi-Fi Direct is executed (F805). In this case, unlike the second embodiment, the Intent value of the camera 32 may be a desirable value. In negotiation in this case, it is assumed that the Intent value of the camera 32 is larger than the Intent value of the smartphone 33, and the camera 32 determines to operate as GO (F806). Then, the smartphone 33 being GO provides the communication parameter to the camera 32, and shares the communication parameter between the devices (F807).

In the processing in S701 of FIG. 7, the operation of the camera 32 in this embodiment is similar to that in the flowchart in FIG. 7 except that the Intent value is set at a desirable value.

As described above, even if plural kinds of communication parameter sharing processing are supported, two devices can be easily connected by Wi-Fi Direct.

Other Embodiments

In the above-described embodiments, the case is described in which the camera 32 is the device that displays the QR code and the smartphone 33 is the device that captures the QR code. However, the camera 32 may operate as the device that captures the QR code, and the smartphone 33 may operate as the device that displays the QR code. Also, the camera 32 and the smartphone 33 each can select to operate as the device that displays the QR code or the device that captures the QR code. In this case, the camera 32 and the smartphone 33 each may select to operate as the device that displays the QR code or the device that captures the QR code in accordance with an instruction by a user.

Also, in the third embodiment, the camera 32 and the smartphone 33 each may determine the role whether GO or CL on the basis of the information included in the QR code.

Also, the above-described embodiments may use Persistent Group being a mode in which the communication parameter defined by Wi-Fi Direct is re-usable. Also, in this case, the device that operates as GO may execute connection processing for forming Persistent Group by using invitation defined by Wi-Fi Direct.

In this case, the communication parameter is exchanged immediately after the QR code is acquired and the identification information is exchanged, and the device retrieval processing and Go Negotiation processing defined by Wi-Fi Direct are omitted.

Also, in the above-described embodiments, the case is described in which the information for setting the communication parameter is exchanged between the devices by using image capturing of the QR code. However, instead of image capturing of the QR code, wireless communication, such as near field communication (NFC) or Bluetooth (registered trademark), may be used. Alternatively, wireless communication, such as IEEE 802.11ad or TransferJet (registered trademark), may be used.

The QR code to be read is not limited to the QR code displayed on the display unit, and may be a QR code attached in a form of a seal to a casing of a communication device. Alternatively, the QR code to be read may be a QR code attached to an operation manual or a packaging such as a corrugated cardboard carton or the like used at sale of a communication device. Also, instead of the QR code, a one-dimensional barcode, or a two-dimensional code other than the QR code may be used. Also, instead of machine-readable information such as the QR code, user-readable information may be used.

Also, in each of the embodiments, the case is described in which the communication between the devices is executed by wireless LAN communication conforming to IEEE 802.11. However, it is not limited thereto. For example, communication may be executed by using a wireless communication medium, such as a wireless universal serial bus (USB), MBOA, Bluetooth (registered trademark), ultra-wideband (UWB), ZigBee, or NFC. In this case, MBOA is abbreviation for Multi Band OFDM Alliance. Also, UWB includes a wireless USB, a wireless 1394, Wireless Networks (WINET), etc.

With the embodiments, the role determination processing can be easily executed by determining the role of the base station or the slave station in accordance with the role of executing image capturing or not in the communication parameter sharing processing executed on the basis of the information acquired from the captured image.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-080448, filed Apr. 9, 2015, which is hereby incorporated by reference herein in its entirety.

The invention claimed is:

1. A communication device comprising:
   one or more processors; and
   one or more memories storing instructions that, when executed by the one or more processors, cause the communication device to perform the following operations:
   sharing a communication parameter for establishment of wireless connection with a communication target device by first sharing processing to be executed by one of the communication device or the communication target device displaying an image and the other capturing the image;
   in a case where the sharing executes the first sharing processing, determining whether the communication device makes communication in a first role in which the communication device operates as a base station, or the communication device makes communication in a second role in which the communication device operates as a slave station connected to a wireless network constructed by a base station, in accordance with whether the communication device displays or captures the image, wherein the determining determines that the communication device makes communication in the first role on the condition that the communication device displays the image;

establishing the wireless connection with the communication target device on the basis of the communication parameter shared by the sharing; and communicating with the communication target device in accordance with the role determined by the determining.

2. The communication device according to claim 1, wherein the operations further comprise executing second sharing processing for sharing the communication parameter for the establishment of the wireless connection with the communication target device.

3. The communication device according to claim 2, wherein, in a case where the communication device communicates with the communication target device, the communication device selects the execution of the first sharing processing by the sharing or the execution of the second sharing processing by the executing, on the basis of information included in a signal received from the communication target device.

4. The communication device according to claim 2, wherein, in a case where the communication device communicates with the communication target device, the communication device selects the execution of the first sharing processing by the sharing or the execution of the second sharing processing by the executing, on the basis of an operation by a user with the communication device.

5. The communication device according to claim 2, wherein, in a case where the communication device communicates with the communication target device, the communication device selects the execution of the first sharing processing by the sharing or the execution of the second sharing processing by the executing, on the basis of an encryption strength when the communication parameter is transmitted or received by encryption communication.

6. The communication device according to claim 5, wherein the communication device selects one of the first sharing processing or the second sharing processing depending on which has a higher encryption strength when the communication parameter is transmitted or received by the encryption communication, as sharing processing to be executed.

7. The communication device according to claim 2, wherein the communication device selects the first sharing processing with high priority in a case where the communication target device can execute the first sharing processing.

8. The communication device according to claim 2, wherein the second sharing processing is Wi-Fi Protected Setup (WPS).

9. The communication device according to claim 1, wherein the first sharing processing transmits or receives the communication parameter by the encryption communication between the devices on the basis of encryption information included in information acquired from the captured image.

10. The communication device according to claim 1, wherein the operations further comprise causing the image used for the first sharing processing to be displayed on a display.

11. The communication device according to claim 1, wherein the operations further comprise capturing the image used for the first sharing processing.

12. The communication device according to claim 1, wherein the determining unit determines that the communication device makes the communication in the first role in a case where the communication device does not capture the image.

13. The communication device according to claim 1, wherein the determining determines that the communication device makes the communication in the second role in a case where the communication device does not capture the image.

14. The communication device according to claim 1, wherein the determining determines that the communication device makes the communication in the second role on the condition that the communication device captures the image.

15. The communication device according to claim 1, wherein the first sharing processing is executed on the basis of information acquired from an image obtained by capturing a barcode or a two-dimensional code.

16. The communication device according to claim 1, wherein the communication parameter includes at least one of a service set identifier, an encryption key, an encryption method, an authentication key, or an authentication method.

17. The communication device according to claim 1, wherein the communication parameter is information for making communication conforming to IEEE 802.11 standard.

18. The communication device according to claim 1, wherein the communication device and the communication target device connect with one another by using Wi-Fi Direct.

19. The communication device according to claim 1,
wherein the first role provides the communication parameter to the communication target device in the first sharing processing, and
wherein the second role receives the communication parameter from the communication target device in the first sharing processing.

20. The communication device according to claim 1,
wherein the first role is a group owner of Wi-Fi Direct, and
wherein the second role is a client of the Wi-Fi Direct.

21. A control method of a communication device, comprising:
sharing a communication parameter for establishment of wireless connection with a communication target device by first sharing processing to be executed by one of the communication device or the communication target device displaying an image and the other capturing the image;
in a case where the sharing executes the first sharing processing, determining whether the communication device makes communication in a first role in which the communication device operates as a base station, or the communication device makes communication in a second role in which the communication device operates as a slave station connected to a wireless network constructed by a base station, in accordance with whether the communication device displays or captures the image, wherein the determining determines that the communication device makes communication in the first role on the condition that the communication device displays the image;

establishing the wireless connection with the communication target device on the basis of the communication parameter shared by the sharing; and communicating with the communication target device in accordance with the role determined in the determining.

22. A non-transitory computer readable storage medium storing a program for causing a communication device to perform a process, the process comprising:

sharing a communication parameter for establishment of wireless connection with a communication target device by first sharing processing to be executed by one of the communication device or the communication target device displaying an image and the other capturing the image;

in a case where the sharing executes the first sharing processing, determining whether the communication device makes communication in a first role in which the communication device operates as a base station, or the communication device makes communication in a second role in which the communication device operates as a slave station connected to a wireless network constructed by a base station, in accordance with whether the communication device displays or captures the image, wherein the determining determines that the communication device makes communication in the first role on the condition that the communication device displays the image;

establishing the wireless connection with the communication target device on the basis of the communication parameter shared by the sharing; and communicating with the communication target device in accordance with the role determined in the determining.

* * * * *